though the mechanical thinner very often removes all of the plants, leaving a long space with no plants. Prior devices using a plant operated switch have also proved unsatisfactory for one reason or another.

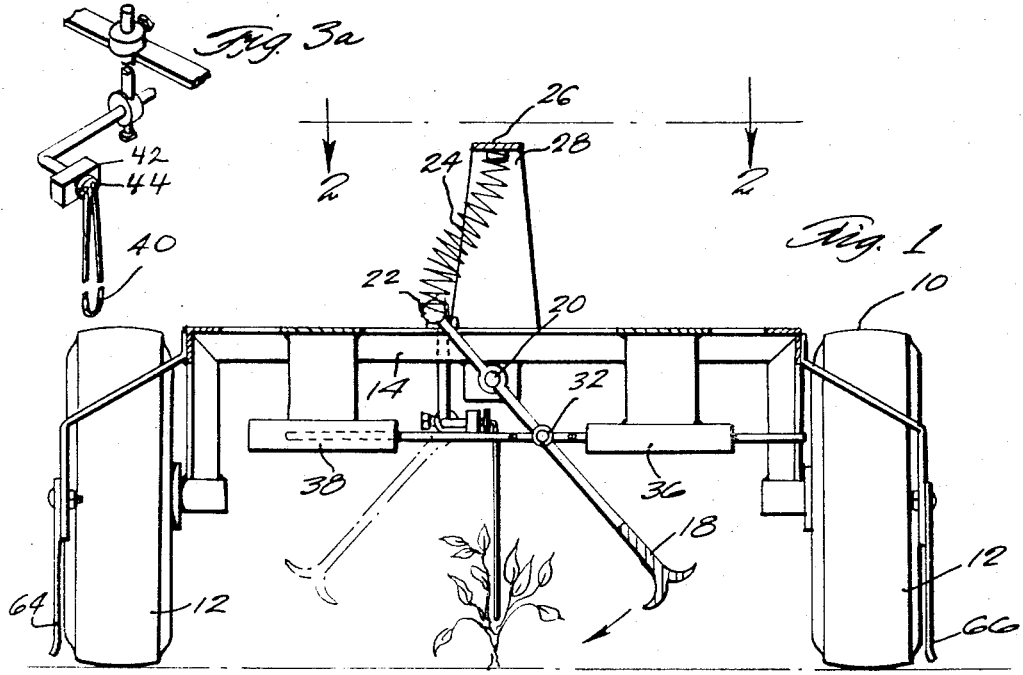
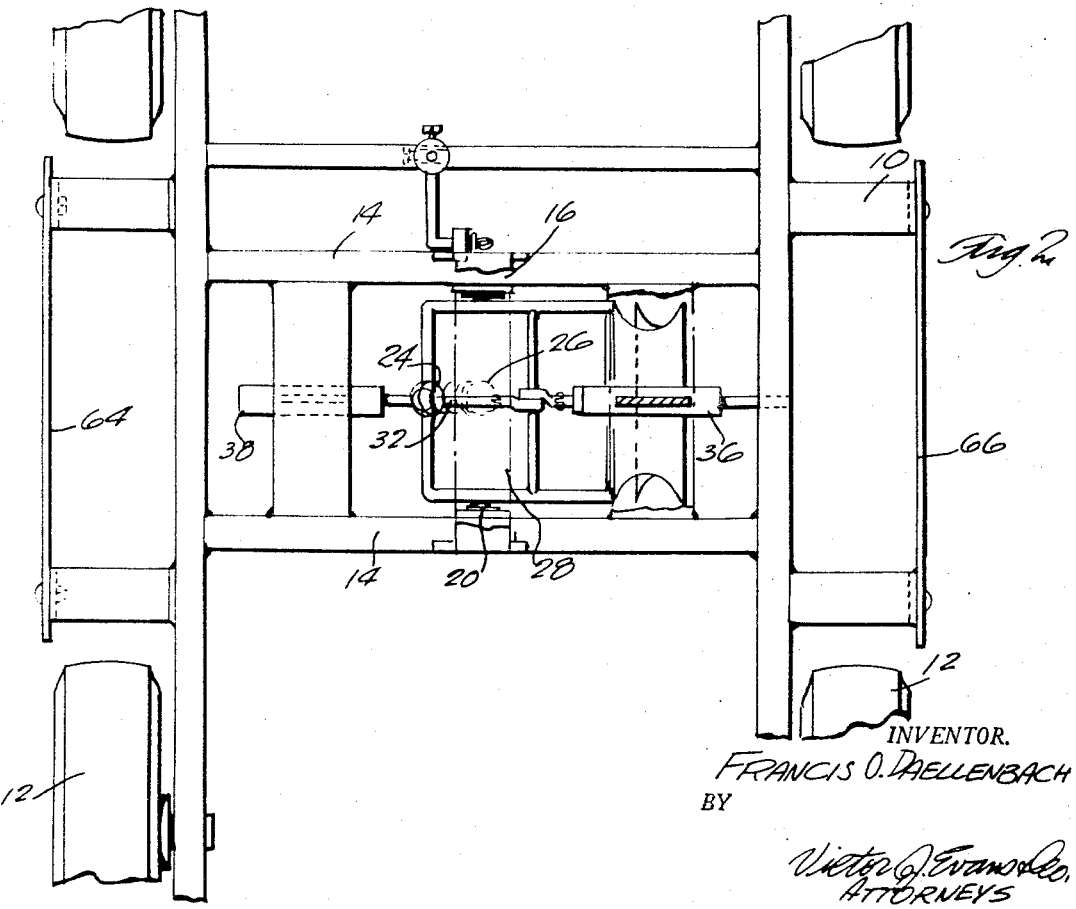

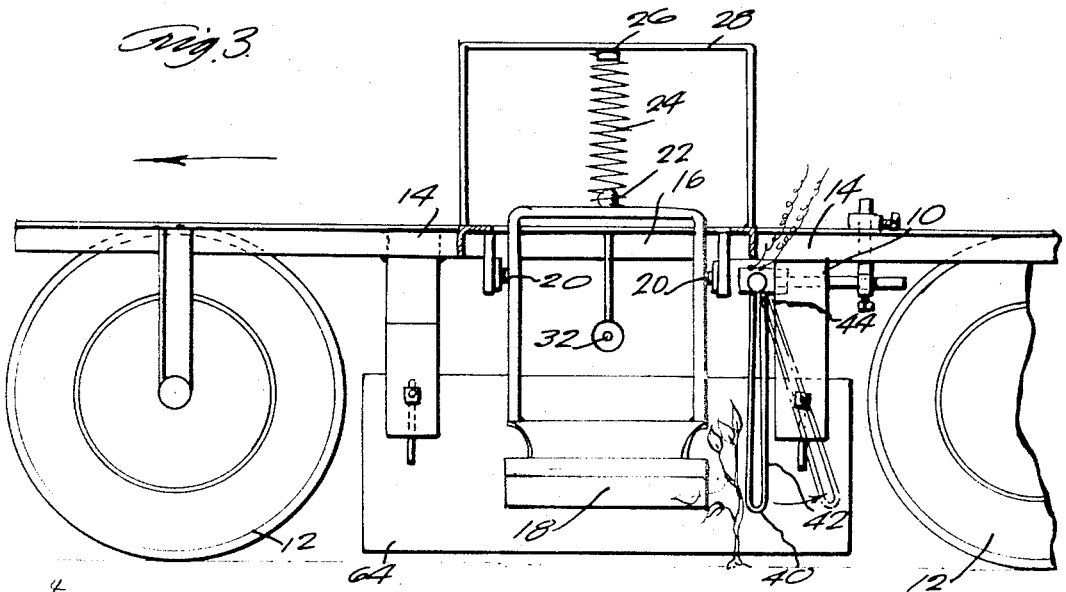
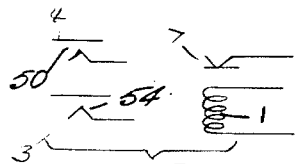
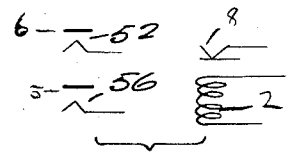
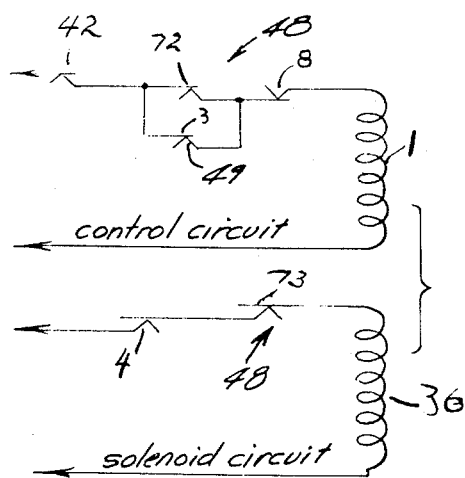
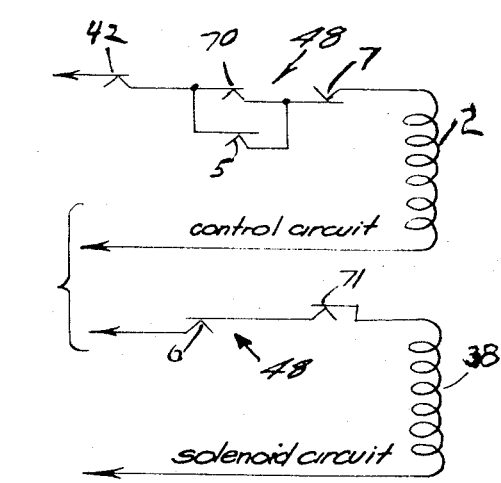

An object of the present invention is to provide an improved sensor and thinning device actuable by one or more microswitches which are actuated by a plant, and no thining action can take place except in front of a plant. If the plants are already thin enough or too thin they will not be further thinned.

A further object of the present invention is to provide sensors in a thinning device for row crops that is sensitive enough to be tripped by a tender plant without having it bounce against a return stop in actuating the hoe more than once per thinning and removing of a plant or plants.

A further feature of the invention is to provide a resilient or spring means that is flexible enough to allow a sensing and thinning device to ride over any plant and light enough to snap back rapidly without any bouncing.

The above and other objects and advantages of the invention will become apparent upon full consideration of the following detailed description and accompanying drawings in which:

FIGURE 1 is a cross-sectional view of a wheeled tractor vehicle adapted to selectively thin plants from row crops in accordance with the preferred embodiment of the invention;

FIGURE 2 is a cross-sectional view taken along lines 2—2 of FIGURE 1;

FIGURE 3a is an isometric view of the plant sensing means;

FIGURE 3 is a side elevational view of FIGURE 1;

FIGURES 4 and 5 represent the electrical components of two identical relays with coils 1 and 2, normally open points 3, 4, 5 and 6, and normally closed points 7 and 8. It is to be understood that when either coil 1 or 2 is conducting electricity the points on that particular relay will be reversed, that is, the open points will be closed and the closed point will be open. These relays may be placed in any convenient position on the frame of the device; and FIGURES 6 and 7 are circuit diagrams showing microswitch, relay and solenoid circuit elements for actuation of the hoe of the selective thinner apparatus in accordance with the preferred embodiment of the invention.

Referring now to the drawings, there is shown a wheeled tractor vehicle 10 having wheels 12, 12, 12, 12, and a frame 14, 14 from which is mounted a cross member 16 and a pivotally mounted hoe 18. The hoe 18 is pivotally connected at juncture means 20, 20 and has an upper free end 22 which engages a compression spring 24 which is mounted between the free end 22 and an upper base 26 mounted on an upper frame 28.

Also pivotally mounted to the hoe at pin means 32 are opposing actuable solenoids 36, 38 which are electrically actuable from a sensor means 40 which with a pivotal mechanism 44 is caused to selectively actuate one of the solenoids. Looking at FIGURE 1, if solenoid 38 were energized one thinning operation would take place and the hoe would then be in the dotted position. The electrical circuits for alternately energizing one and then the other of these solenoids is explained below.

Side shields or protector elements 64, 66 are shown in each of FIGURES 1, 2 and 3, respectively, for preventing the hoe from throwing the plant that has been thinned out into the next row or to any other position exterior of the tractor vehicle. These side shields assure that the cut off plants will be left between the rows where they cannot activate the sensors and cause an unwanted thinning operation. The hoe 18 may be adjustably positioned upwardly or downwardly according to conditions, and the sensor likewise, as described above, may be adjusted upward or downward as well as forward or backward to accommodate the sensing of various sized plants. For reasons of simplicity, only one sensor is shown but in use two or more sensors may be desirable to give a degree of discrimination. For instance, sugar beet plants are low and wide while many weeds are tall and slender. If two sensors mounted side by side at such a distance apart that a beet plant could contact both of them at once but the slender weed could only contact one or the other and if the switches to these sensors were electrically in series the weed could not activate the hoe but the beet plant would.

It is within the purview of the invention to provide any of a number of tractor vehicles such as are described herein, one for each row being thinned so that they may be drawn by a common tractor unit, and the electrical systems of each of the tractor units 10 may be energized from a common battery source.

In operation, assuming that the hoe is adjusted to cut the proper distance below ground level and that the sensor is adjusted above ground level but low enough to contact a plant and far enough back of the hoe that when the switch 42 is closed the hoe may make a rapid lateral movement just in front of the plant which is deflecting the sensor 40 but not to cut the plant which is deflecting sensor 40. 42 is a switch with a pivoted actuator 44 which is spring loaded in the position shown in FIGURE 3. 40 is a thin flexible loop of spring wire. When 40 is deflected to the dotted position (FIGURE 3) switch 42 will close a control circuit, FIGURES 6 and 7. Loop 40 may then continue to flex up and back until it is past the plant, at which time it will snap back to the position shown in FIGURE 3. Switch 42 is open at all times unless 40 is in the deflected position. With the device being pulled down a row in the direction indicated in FIGURE 3 with the hoe in the position shown in FIGURE 1, when 40 contacts a plant it deflects to the dotted position closing 42. Since switch 72 is open but switch 70 is being held closed by spring 24 current flows through 70, 7 and of course 42 and energizes coil 2. This closes 5 and 6 and opens 8 (see FIGURE 5). When 6 closes, the solenoid 38 is energized through normally closed switch 71. As soon as the hoe is moved, switch 70 opened but 5 was then closed to provide an alternate route for the current to energize 2. As the hoe completes its stroke to the dotted position, spring 24 now opens switch 71 cutting off the solenoid current. Current continues to flow through 2 until 40 rides over the plant and returns to normal, opening 42. On the next contact of 40 with a plant, switch 70 will be open and the current must flow as shown in FIGURE 7.

What is claimed is:

1. A selective thinning apparatus for row crops comprising a wheeled vehicle to be drawn over rows of crops having its frame adapted to straddle the crops to be thinned, a pivotally mounted hoe disposed from a frame intermediate the wheels of said vehicle to swing transversely to the rows, a set of solenoids to actuate the swing of the hoe in each of its transverse directions of pendulumized swing, a retaining or compression spring to generally maintain the hoe in one of its extended rest positions, a sensor element mounted rearwardly of the hoe, a set of microswitch contacts and relays to be actuated by the sensor element and close the circuit to one of the solenoid relays and to preclude actuation of the other solenoid relay until the hoe again is in its next one of its extended rest positions, side shield elements mounted adjacent to each side and in alignment with said pendulumized swing for limiting the trajectory path of the thinned plants so that the cutoff plants will be left between the rows where they cannot activate the sensor element, said solenoids pivotally engaged to said hoe in opposed relation, the hoe and the sensor elements being adapted to be adjusted for use with various types of row crops and with various stages of growth.

References Cited

UNITED STATES PATENTS

| 258,512 | 5/1882 | Walden | 172—81 X |
| 1,133,044 | 3/1915 | Lanham | 172—62 |
| 2,592,689 | 4/1952 | Hann | 172—6 |
| 3,308,890 | 3/1967 | Rhode | 172—6 |
| 3,358,775 | 12/1967 | Garrett | 172—6 |

FOREIGN PATENTS 900,280  7/1962  Great Britain.

ANTONIO F. GUIDA, *Primary Examiner.*

A. E. KOPECKI, *Assistant Examiner.*